(12) United States Patent
Joung et al.

(10) Patent No.: US 8,941,648 B2
(45) Date of Patent: Jan. 27, 2015

(54) MOBILE TERMINAL AND CONTROL METHOD THEREOF

(71) Applicant: LG Electronics Inc., Seoul (KR)

(72) Inventors: Jinhwa Joung, Gwangmyeong (KR); Daeun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 13 days.

(21) Appl. No.: 13/687,972

(22) Filed: Nov. 28, 2012

(65) Prior Publication Data

US 2013/0141430 A1 Jun. 6, 2013

(30) Foreign Application Priority Data

Dec. 2, 2011 (KR) .......................... 10-2011-0128516

(51) Int. Cl.
```
G06T 15/00     (2011.01)
H04N 13/04     (2006.01)
H04N 1/00      (2006.01)
G06F 3/0488    (2013.01)
H04N 13/00     (2006.01)
```
(52) U.S. Cl.
CPC ........... *H04N 13/04* (2013.01); *H04N 1/00307* (2013.01); *H04N 1/00411* (2013.01); *H04N 1/00448* (2013.01); *G06F 3/04883* (2013.01); *H04N 13/0022* (2013.01); *H04N 2201/0096* (2013.01); *G06F 2203/04101* (2013.01)
USPC .......................................... 345/419; 715/863

(58) Field of Classification Search
CPC ..................................................... G02B 27/22
USPC .......................................... 345/419; 715/863
See application file for complete search history.

(56) References Cited

U.S. PATENT DOCUMENTS 7,770,130 B1 *   8/2010   Kaptelinin ................... 715/787
2012/0076399 A1 * 3/2012   Yamaji et al. ................ 382/154

* cited by examiner

*Primary Examiner* — Maurice L McDowell, Jr.
(74) *Attorney, Agent, or Firm* — KED & Associates LLP

(57) ABSTRACT

A mobile terminal for displaying digital contents and a control method thereof may be provided. The mobile terminal may include: a display unit configured to display a first page of digital contents and at least a portion of a second page different from the first page together, and a controller to control a three-dimensional (3D) depth value of at least one of the first and second pages such that the first page can have a 3D depth different from the second page in a state in which the first and second pages are displayed together.

25 Claims, 20 Drawing Sheets

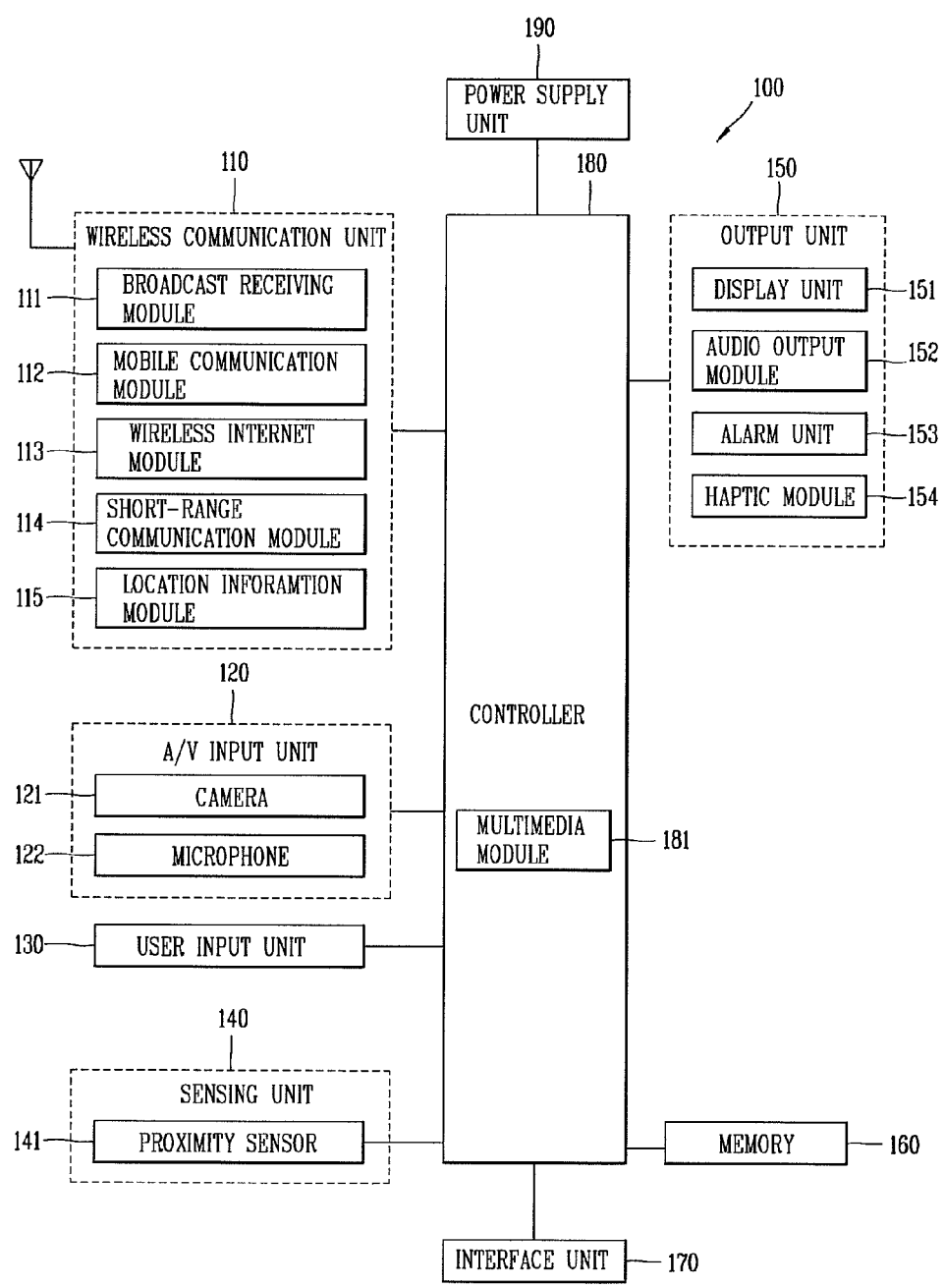

MOBILE TERMINAL AND CONTROL METHOD THEREOF

CROSS REFERENCE TO RELATED APPLICATION

The present application claims priority from Korean Application No. 10-2011-0128516, filed Dec. 2, 2011, the subject matter of which is incorporated herein by reference.

BACKGROUND

1. Field

Embodiments may relate to a mobile terminal capable of displaying digital contents.

2. Description of Background Art

Terminals may be classified as a mobile terminal and/or stationary terminal based on whether (or not) the terminals are movable. Mobile terminals may be classified as a hand-held terminal and/or a vehicle mount terminal based on whether (or not) a user can directly carry the terminal.

The mobile terminal may support more complicated functions such as capturing images or video, reproducing music or video files, playing games, receiving broadcast signals, and/or the like. By comprehensively and collectively implementing such functions, the mobile terminal may be embodied in a form of a multimedia player or device. Efforts may be ongoing to support and increase functionality of mobile terminals. Such efforts may include software and hardware improvements, as well as changes and improvements in structural components that form the mobile terminal.

A terminal may have a digital contents display function. However, when a page of digital contents is displayed on a screen of the terminal, a user may not be able to view content of a next page in advance. Additionally, when two pages of digital contents are displayed together on a screen of the mobile terminal, the two pages may be displayed in a small manner due to size limitations of the screen. This may cause inconvenience in that the user may not recognize a boundary between the two pages.

BRIEF DESCRIPTION OF THE DRAWINGS

Arrangements and embodiments may become more fully understood from the detailed description and the accompanying drawings, in which like reference numerals refer to like elements and wherein:

FIG. 1 is a block diagram of a mobile terminal;

DETAILED DESCRIPTION

Figure 2A:
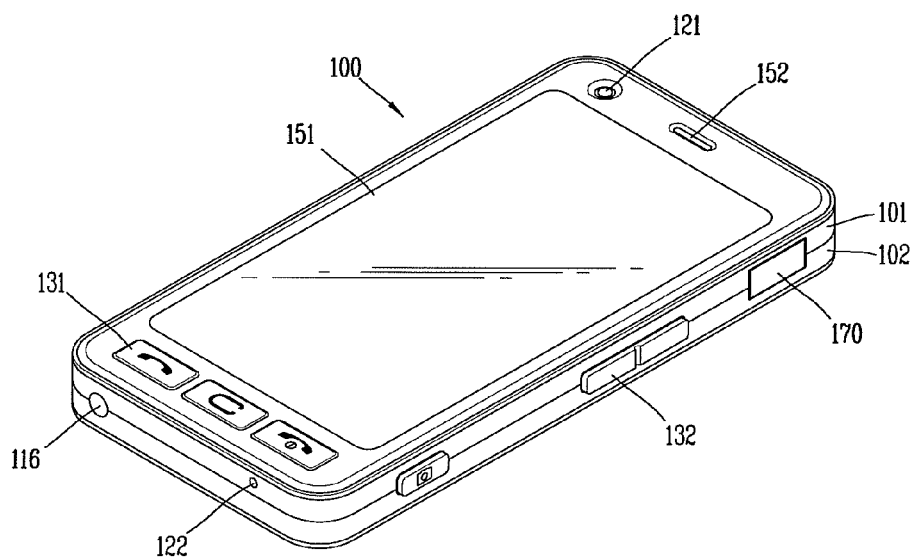
FIGS. 2A and 2B are perspective views showing an outer appearance of the mobile terminal.

FIG. 1 is a block diagram of a mobile terminal according to an arrangement. Other arrangements may also be provided.

FIG. 1 shows that a mobile terminal 100 may include a wireless communication unit 110, an A/V (Audio/Video) input unit 120 (hereafter referred to as a user tracking unit), a user input unit 130, a sensing unit 140, an output unit 150, a memory 160, an interface unit 170, a controller 180, and a power supply unit 190, etc. FIG. 1 shows the mobile terminal 100 as having various components, although it should be understood that implementing all of the illustrated components is not a requirement. Greater or fewer components may alternatively be implemented.

The wireless communication unit 110 may include one or more modules allowing for wireless (or radio) communication between the mobile terminal 100 and a wireless communication system or between the mobile terminal 100 and a network in which the mobile terminal 100 is located. For example, the wireless communication unit 110 may include at least one of a broadcast receiving module 111, a mobile communication module 112, a wireless Internet module 113, a short-range communication module 114, and a location information module 115 (or position information module).

The broadcast receiving module 111 may receive broadcast signals and/or broadcast associated information from an external broadcast management server via a broadcast channel. The broadcast associated information may refer to information associated with a broadcast channel, a broadcast program or a broadcast service provider. The broadcast associated information may also be provided via a mobile communication network and, in this example, the broadcast associated information may be received by the mobile communication module 112. Broadcast signals and/or broadcast-associated information received via the broadcast receiving module 111 may be stored in the memory 160.

The mobile communication module 112 may transmit and/or receive radio signals to and/or from at least one of a base station, an external terminal, and/or a server. The radio signals may include a voice call signal, a video call signal or various types of data according to text and/or multimedia message transmission and/or reception.

The wireless Internet module 113 may support wireless Internet access for the mobile terminal 100. The wireless Internet module 113 may be internally or externally coupled to the mobile terminal 100. The implemented wireless Internet access technique may include a WLAN (Wireless LAN) (Wi-Fi), Wibro (Wireless broadband), Wimax (World Interoperability for Microwave Access), HSDPA (High Speed Downlink Packet Access), and/or the like.

The short-range communication module 114 may be a module for supporting short range communications. Examples of short-range communication technology may include Bluetooth™, Radio Frequency IDentification (RFID), Infrared Data Association (IrDA), Ultra-WideBand (UWB), ZigBee™, and/or the like.

The location information module 115 may be a module for checking, determining, calculating or acquiring a location (or position) of the mobile terminal 100. An example of the location information module is a GPS (Global Positioning System).

The A/V input unit 120 may provide audio or video signal input to the mobile terminal 100. The A/V input unit 120 may include a camera 121 and a microphone 122. The camera 121 may process image frames of still pictures or video obtained by an image sensor in a video capturing mode or an image capturing mode. The image frames processed by the camera 121 may be displayed on a display unit 151 (or display). The processed image frames may be stored in the memory 160 and/or transmitted to outside via the wireless communication unit 110. Two or more cameras 121 may be provided according to a usage environment.

The microphone 122 may process an audio signal input from an external source into electrical voice data in a phone call mode, a recording mode, a voice recognition mode, and/or the like. The audio (voice) data processed by the microphone 122 may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate input data from commands entered by a user to control various operations of the mobile terminal 100. The user input unit 130 may include a keypad, a dome switch, a touch pad, a jog wheel, a jog switch, and/or the like.

The sensing unit 140 may detect a current status of the mobile terminal 100 such as an opened state or a closed state of the mobile terminal 100, a location of the mobile terminal 100, presence or absence of user contact with the mobile terminal 100 (i.e., touch inputs), orientation of the mobile terminal 100, an acceleration or deceleration movement and direction of the mobile terminal 100, etc., and the sensing unit 140 may generate commands or signals for controlling operation of the mobile terminal 100. For example, when the mobile terminal 100 is implemented as a slide type mobile phone, the sensing unit 140 may sense whether the slide phone is opened or closed. In addition, the sensing unit 140 can detect whether (or not) the power supply unit 190 supplies power or whether (or not) the interface unit 170 is coupled with an external device.

The sensing unit 140 may include a proximity sensor 141. The sensing unit 140 may include a touch sensor for sensing a touch operation with respect to the display unit 151.

The touch sensor may have a form of a touch film, a touch sheet, a touch pad, and/or the like. The touch sensor may be configured to convert pressure applied to a particular portion of the display unit 151 or a change in capacitance or the like generated at a particular portion of the display unit 151 into an electrical input signal. The touch sensor may be configured to detect pressure when a touch is applied, as well as the touched position and area.

When the touch sensor and the display unit 151 are overlaid in a layered manner, the display unit 151 may function as both an input device and an output device. The display unit 151 may also be called a touch screen.

When there is a touch input through the touch screen, a corresponding signal (signals) may be transmitted to a touch controller. The touch controller may process the signals transmitted from the touch sensor and transmit corresponding data to the controller 180. The controller 180 may recognize which portion of the display unit 151 has been touched.

When the touch screen is an electrostatic type touch screen, the touch screen may detect proximity of an object (or a detection target) based on a change in an electric field according to proximity of the object. Such a touch screen may be classified as a proximity sensor 141.

The proximity sensor 141 is a sensor for detecting presence or absence of an object by using force of electromagnetism or infrared rays without a physical contact. Thus, the proximity sensor 141 may have a considerably longer life span compared with a contact type sensor, and the proximity sensor may be utilized for various purposes. Examples of the proximity sensor 141 may include a transmission type photoelectric sensor, a direct reflection type photoelectric sensor, a mirror-reflection type photoelectric sensor, an RF oscillation type proximity sensor, a capacitance type proximity sensor, a magnetic proximity sensor, an infrared proximity sensor, and/or the like.

In the following description, for ease of explanation, recognition of an object to be sensed positioned to be close to the touch screen may be called a proximity touch, while recognition of actual contacting of an object to be sensed on the touch screen may be called a contact touch.

The proximity sensor 141 may sense a proximity touch and a proximity touch pattern (e.g., a proximity touch distance, a proximity touch speed, a proximity touch time, a proximity touch position, a proximity touch movement state, and/or the like), and information corresponding to the detected proximity touch operation and the proximity touch pattern may be outputted to the touch screen.

The output unit 150 may provide outputs in a visual, audible, and/or tactile manner. The output unit 150 may include the display unit 151 (or display), an audio output module 152, an alarm unit 153 (or alarm), a haptic module 154, and/or the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or an image capturing mode, the display unit 151 may display a captured image and/or received image, a UI or GUI that shows videos or images and functions related thereto, and/or the like.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, and/or an e-ink display.

The displays may be configured to be transparent or light-transmissive to allow viewing of exterior, which may be called transparent displays. A transparent display may be a TOLED (Transparent Organic Light Emitting Diode) display, and/or the like, for example. Through such configuration, the user can view an object positioned at a rear side of the terminal body through the region occupied by the display unit 151 of the terminal body.

The mobile terminal 100 may include two or more display units according to its particular desired embodiment. For example, a plurality of display units may be separately or integrally disposed on one surface of the mobile terminal, and/or may be separately disposed on mutually different surfaces.

The display unit 151 may be configured as a stereoscopic display unit that displays a stereoscopic image. The stereoscopic image may be a three-dimensional (3D) stereoscopic image. The 3D stereoscopic image may be an image that allows a viewer (or a user) to feel a gradual depth and reality of an object on a monitor or a screen such that it is the same as those in a reality space. The 3D image may also be called a perceived 3D image.

A 3D stereoscopic image may be implemented by using binocular disparity. Binocular disparity may refer to disparity made by positions of two eyes spaced apart by approximately 65 millimeters. When two eyes view different 2D images, the images may be transferred to the brain through the retina and combined in the brain, and as a result, the viewer may have a perception of a depth and reality sense of the stereoscopic image.

A term depth value may refer to an index indicating a distance between objects included in a perceived 3D image. When an object displayed on the display unit 151 is viewed by a user in the form of a 2D object, a depth value of the object may be considered '0'. However, a depth value of an object viewed in a form protruding to outside of the mobile terminal 100 based on the screen (of the display unit 151) may be considered a negative value. The images may be considered to protrude from the screen. A depth value of an object viewed in a form of recessed into the mobile terminal may be considered a positive number. The images may be considered to be recessed from the screen.

Additionally, as a position at which an object included in a 3D image in the form of protruding to outside is within a short distance, an absolute value of a depth value of the object increases, and as a position at which an object included in a 3D image in the form of being recessed to an interior is within a long distance, a depth value of the object may increase.

For ease of descriptions, as a position at which an object included in the 3D image is viewed is within a short distance, it may be described as a depth value of the object is large, and as a position at which an object included in the 3D image is viewed is within a long distance, it may be described as a depth value of the object is small.

The stereoscopic display unit may employ a 3D display scheme such as a stereoscopic scheme (a glass scheme), an auto-stereoscopic scheme (glassless scheme), a projection scheme (holographic scheme), and/or the like. Stereoscopic schemes used in home television receivers, and/or the like may include a Wheatstone stereoscopic scheme, and/or the like.

The auto-stereoscopic scheme may include a parallax barrier scheme, a lenticular scheme, an integral imaging scheme, and/or the like, for example. The projection scheme may include a reflective holographic scheme, a transmissive holographic scheme, and/or the like.

A 3D stereoscopic image may be comprised of a left image (a left eye image) and a right image (a right eye image). According to how left and right images are combined to form a 3D stereoscopic image, the 3D stereoscopic imaging method may be divided into a top-down method in which left and right images are disposed up and down in a frame, a L-to-R (left-to-right, side by side) method in which left and right images are disposed left and right in a frame, a checker board method in which fragments of left and right images are disposed in a tile form, an interlaced method in which left and right images are alternately disposed by columns and rows, and a time sequential (or frame by frame) method in which left and right images are alternately displayed by time.

As for a 3D thumbnail image (as an example of a 3D stereoscopic image), a left image thumbnail and a right image thumbnail may be generated from a left image and a right image of the original image frame, respectively, and then combined to generate a single 3D thumbnail image. A thumbnail may refer to a reduced image or a reduced still image. The generated left image thumbnail and the right image thumbnail may be displayed with a horizontal distance difference therebetween by a depth corresponding to disparity between the left image and the right image on the screen, providing a stereoscopic space sense.

When a touch sensor is overlaid on the stereoscopic display unit in a layered manner or when the stereoscopic display unit and a 3D sensor sensing a touch operation are combined, the stereoscopic display unit may also be used as a 3D input device. This stereoscopic display unit may also be called a stereoscopic touch screen.

The audio output module 152 may convert and output (as sound) audio data received from the wireless communication unit 110 or stored in the memory 160 in a call signal reception mode, a call mode, a record mode, a voice recognition mode, a broadcast reception mode, and/or the like. The audio output module 152 may provide audible outputs related to a particular function performed by the mobile terminal 100 (e.g., a call signal reception sound, a message reception sound, etc.). The audio output module 152 may include a speaker, a buzzer, and/or other sound generating device(s).

The alarm unit 153 may provide outputs to inform about occurrence of an event of the mobile terminal 100. Events may include call reception, message reception, key signal inputs, a touch input etc. In addition to audio or video outputs, the alarm unit 153 may provide outputs in a different manner to inform about the occurrence of an event. For example, the alarm unit 153 may provide an output in the form of vibrations. A video signal or an audio signal may also be output through the display unit 151 or the audio output module 152, so the display unit 151 and the audio output module 152 may be classified as part of the alarm unit 153.

The haptic module 154 may generate various tactile effects that the user may feel. An example of the tactile effects generated by the haptic module 154 is vibration. Strength and pattern of the haptic module 154 may be controlled. For example, different vibrations may be combined to be outputted or sequentially outputted.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to configuration of the mobile terminal 100.

The memory 160 may store software programs used for processing and controlling operations performed by the controller 180, and/or may temporarily store data (e.g., a phonebook, messages, still images, video, etc.) that are inputted or outputted. The memory 160 may store data regarding various patterns of vibrations and audio signals outputted when a touch is inputted to the touch screen.

The memory 160 may include at least one type of storage medium including a Flash memory, a hard disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. The mobile terminal 100 may operate in relation to a web storage device that performs a storage function of the memory 160 over the Internet.

The interface unit 170 may serve as an interface with every external device connected with the mobile terminal 100. For example, the external devices may transmit data to an external device, receive and transmit power to each element of the mobile terminal 100, and/or transmit internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, and/or the like.

The identification module may be a chip that stores various information for authenticating authority of using the mobile terminal 100 and may include a user identity module (UIM), a subscriber identity module (SIM) a universal subscriber identity module (USIM), and/or the like. The device having the identification module (hereafter referred to as an identifying device) may take the form of a smart card. Accordingly, the identifying device may be connected with the mobile terminal 100 via a port.

When the mobile terminal 100 is connected with an external cradle, the interface unit 170 may serve as a passage to allow power from the cradle to be supplied therethrough to the mobile terminal 100, or the interface unit 170 may serve as a passage to allow various command signals inputted by the user from the cradle to be transferred to the mobile terminal 100 therethrough. Various command signals or power inputted from the cradle may operate as signals for recognizing that the mobile terminal 100 is properly mounted on the cradle.

The controller 180 may control operations of the mobile terminal. For example, the controller 180 may perform controlling and processing associated with voice calls, data communications, video calls, and/or the like. The controller 180 may include a multimedia module 181 for reproducing multimedia data. The multimedia module 181 may be configured within the controller 180, or may be configured to be separated from the controller 180. The controller 180 may perform a pattern recognition processing to recognize a handwriting input or a picture drawing input performed on the touch screen as characters or images, respectively.

The power supply unit 190 may receive external power or internal power and supply appropriate power required for operating respective elements and components under the control of the controller 180.

Various arrangements and embodiments described herein may be implemented in a computer-readable or its similar medium using, for example, software, hardware, or any combination thereof.

For hardware implementation, arrangements and embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, arrangements and embodiments such as procedures or functions described herein may be implemented by separate software modules. Each software module may perform one or more functions or operations described herein. Software codes may be implemented by a software application written in any suitable programming language. The software codes may be stored in the memory 160 and executed by the controller 180.

The user input unit 130 may be manipulated to receive a command for controlling operation of the mobile terminal 100. The user input unit 130 may include a plurality of manipulation units. The manipulation units may be referred to as a manipulating portion, and various methods and techniques may be employed for the manipulation portion so long as they can be operated by the user in a tactile manner.

Various types of visual information may be displayed on the display unit 151. The information may be displayed in the form of character, number, symbol, graphic, icon, etc. In order to input the information, at least one of the character, number, symbol, graphic and icon may be displayed in a certain arrangement so as to be implemented in the form of a keypad. The keypad may be soft keys.

The display unit 151 may operate as a whole region or may be divided into a plurality of regions and accordingly operated. In the latter case, the plurality of regions may operate in association with each other. For example, an output window and an input window may be displayed at upper and lower portions of the display unit 151, respectively. The output window and the input window are regions allotted for outputting or inputting information, respectively. Soft keys including numbers for inputting a phone number, and/or the like, may be outputted to the input window. When the soft key is touched, a number corresponding to the touched soft key may be displayed on the output window. When the manipulation unit is manipulated, a call connection with respect to a phone number displayed on the output window may be attempted, or text displayed on the output window may be input to an application.

The display unit 151 or the touch pad may be configured to sense touch scrolling. The user may move a cursor or a pointer positioned on an entity (e.g., an icon or the like) displayed on the display unit 151 by scrolling the display unit 151 or the touch pad. When the user moves his fingers on the display unit 151 or the touch pad, a path along which the user's fingers move may be visually displayed on the display unit 151. This may be useful in editing an image displayed on the display unit 151.

One function of the terminal may be executed when the display unit 151 and the touch pad are touched together within a certain time range. The both touches may be clamping the terminal body with the user's thumb and index finger. The one function executed in this case may be activation or deactivation of the display unit 151 or the touch pad, for example.

Figure 2B:
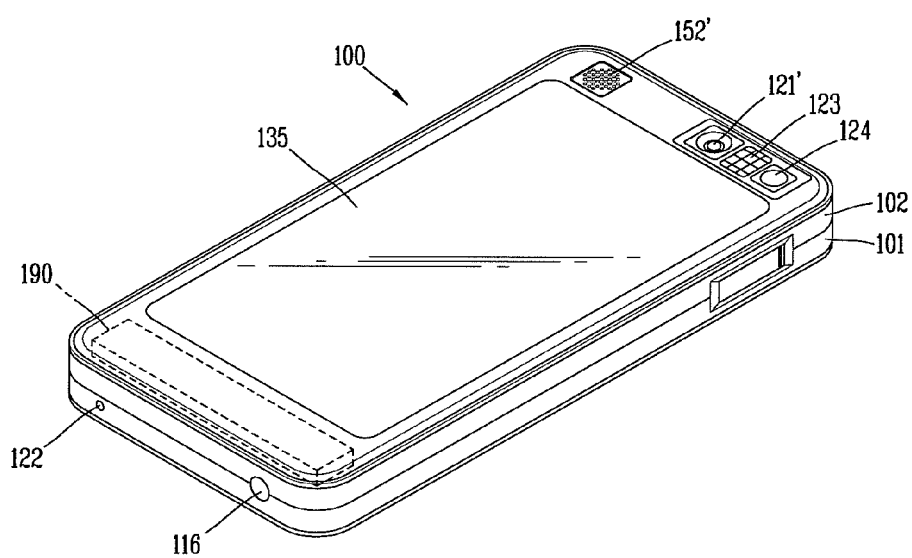

FIGS. 2A and 2B are perspective views showing an external appearance of the mobile terminal 100. Other arrangements may also be provided. FIG. 2A shows a front surface and one lateral surface of the mobile terminal 100. FIG. 2B shows a rear surface and another lateral surface of the mobile terminal 100.

With reference to FIG. 2A, the mobile terminal 100 may have a bar type terminal body. However, embodiments may also be applicable to a slide type mobile terminal, a folder type mobile terminal, a swing type mobile terminal, a swivel type mobile terminal, and/or the like, in which two or more bodies are coupled to be movable relatively.

The terminal body may include a case (or casing, housing, cover, etc.) constituting an external appearance of the terminal body. The case may be divided into a front case 101 and a rear case 102. Various electronic components may be installed in the space between the front case 101 and the rear case 102. One or more intermediate cases may be additionally disposed between the front case 101 and the rear case 102.

The cases may be formed by injection-molding a synthetic resin or may be made of a metallic material such as stainless steel (STS) or titanium (Ti), etc.

The display unit 151, the audio output module 152, the camera 121, and the user input unit 130, the microphone 122, the interface 170, and/or the like, may be located on the terminal body (e.g. on the front case 101).

The display unit 151 may occupy most of the front surface of the front case 101. The audio output module 152 and the camera 121 are disposed at a region adjacent to one end portion of the display unit 151. A first user input unit 131 and the microphone 122 may be disposed at a region adjacent to the other end portion of the display unit 151. A second user input unit 132 and the interface 170 may be disposed on sides of the front case 101 and the rear case 102.

The user input unit 130 may be manipulated to receive commands for controlling operation of the mobile terminal 100, and may include a plurality of manipulation units 131 and 132.

The manipulation units 131 and 132 may be generally called a manipulating portion, and the manipulation units 131 and 132 may employ any method so long as they can be manipulated in a tactile manner by the user.

The first or second manipulation unit 131 or 132 may receive various commands. For example, the first manipulation unit 131 may receive commands such as start, end, scroll, or the like, and the second manipulation unit 132 may receive commands such as adjustment of size of a sound outputted from the audio output module 152, conversion to a touch recognition mode of the display unit 151, and the like.

With reference to FIG. 2B, a rear camera 121' may additionally be disposed at (or on) a rear surface of the terminal body (i.e., on the rear case 102). The rear camera 121' may have an image capture direction that is substantially opposite to that of the camera 121 (See FIG. 2A), and the rear camera 121' may support a different number of pixels (i.e., have a different resolution) than the front camera 121.

For example, the front camera 121 may have a relatively small number of pixels, and the rear camera 121' may have a relatively large number of pixels. Thus, use of the front camera 121 for a video call may reduce a size of transmission data in case of capturing the user's face and transmitting the captured image to a counterpart in real time. The rear camera 121' may be used for the purpose of storing a high quality image.

The cameras 121 and 121' may be installed at (or on) the terminal such that they are rotated or popped up.

A flash 123 and a mirror 124 may be additionally disposed adjacent to the camera 121'. When the user captures an image of the subject with the rear camera 121', the flash 123 may illuminate the subject. The mirror 124 may allow the user to see himself when he wants to capture his own image (i.e., self-image capturing) by using the rear camera 121'.

An audio output unit 152' may be additionally disposed at (or on) the rear surface of the terminal body. The rear audio output unit 152' may implement a stereoscopic function along with the audio output module 152. The rear audio output unit 152' may be used for implementing a speaker phone mode during call communication.

A broadcast signal receiving antenna 116 may be additionally disposed at (or on) a side of the terminal body in addition to an antenna that supports call communications. The antenna 116 forming a portion of the broadcast reception module 111 may be installed to be drawn out of the terminal body.

A power supply unit 190 for supplying power to the mobile terminal 100 may be installed at (or on) the terminal body. The power supply unit 190 may be installed in the terminal body or may be directly detached from outside of the terminal body.

A touch pad 135 for detecting a touch may be additionally mounted at (or on) the rear case 102. The touch pad may be configured to be light-transmissive like the display unit 151. A rear display unit may be additionally mounted at (or on) the touch pad 135 in order to output visual information. Information output from both of the front display unit 151 and the rear display unit may be controlled by the touch pad 135.

The touch pad 135 may operate in relation to the display unit 151. The touch pad 135 may be disposed to be parallel to the rear side of the display unit 151. The touch pad 135 may have a same size as the display unit 151 or may be smaller than the display unit 151.

The mobile terminal 100 may display a perceived three-dimensional (3D) stereoscopic image allowing for a depth perception and stereovision, beyond displaying a two-dimensional image. A perceived 3D image is an image that allows a user to feel a same depth and reality of an object positioned on the display unit 151 as those in a practical space. Thus, the user may enjoy a more realistic user interface (UI) or contents through a three-dimensional stereoscopic image. The 3D image may also be referred to as a perceived 3D image.

The mobile terminal 100 may provide various methods in relation to a digital contents display function.

When one page of digital contents is displayed on the display unit 151, the user may not be able to view content of a next page in advance. When two pages of digital contents are displayed together on the display unit 151, the two pages may be displayed to be smaller due to a size limitation of the display unit 151, thereby making it difficult for the user to recognize a boundary between the two pages.

The mobile terminal 100 capable of discriminatively displaying two pages of digital contents on the display unit 151 and a control method thereof may be described with reference to the accompanying drawings.

Figure 3:
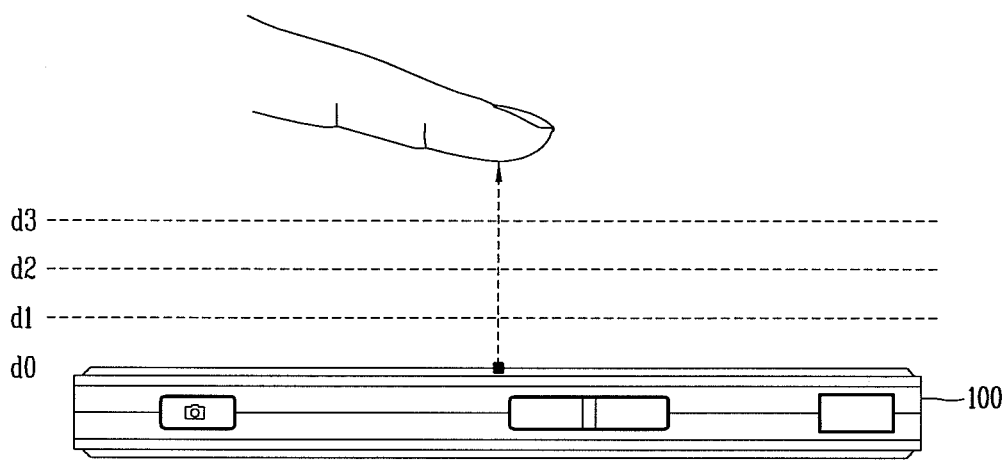
FIG. 3 is a view for explaining a proximity depth of a proximity sensor.

FIG. 3 is a view for explaining a proximity depth of a proximity sensor.

As shown in FIG. 3, when a pointer (such as a user's finger) approaches the touch screen, the proximity sensor 141 located inside or near the touch screen may sense the approach of the pointer, and may output a proximity signal.

The proximity sensor may be constructed such that the proximity sensor outputs a proximity signal according to a distance between the pointer approaching the touch screen and the touch screen (referred to as "proximity depth").

The distance in which the proximity signal is output when the pointer approaches the touch screen may be referred to as a detection distance. The proximity depth may be determined by using a plurality of proximity sensors having different detection distances and by comparing proximity signals respectively output from the proximity sensors.

FIG. 3 shows a section of the touch screen in which the proximity sensor 141 capable of sensing three proximity depths may be provided. Proximity sensors capable of sensing less than three or more than four proximity depths may be provided at the touch screen.

More specifically, when the pointer completely contacts the touch screen (D0), it may be recognized as contact touch. When the pointer is located within a distance D1 from the touch screen, it may be recognized as a proximity touch of a first proximity depth. When the pointer is located in a range between the distance D1 and a distance D2 from the touch screen, it may be recognized as a proximity touch of a second proximity depth. When the pointer is located in a range between the distance D2 and a distance D3 from the touch screen, it may be recognized as a proximity touch of a third proximity depth. When the pointer is located greater than the distance D3 from the touch screen, it may be recognized as cancellation of the proximity touch.

Accordingly, the controller 180 may recognize the proximity touch as various input signals according to proximity distance and proximity position of the pointer with respect to the touch screen, and the controller 810 may perform various operation controls according to the input signals.

Figure 4:
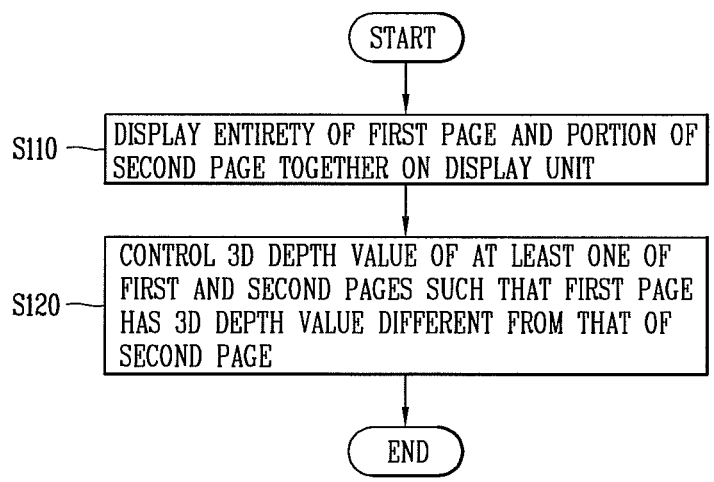
FIG. 4 is a flow chart of a control method of the mobile terminal according to an example embodiment.

FIG. 4 is a flow chart of a control method of the mobile terminal 100 according to an example embodiment. Other embodiments and operations may also be provided.

The mobile terminal 100 may include the display unit 151 and the controller 180.

Referring to FIG. 4, an entirety of a first page of digital contents and at least a portion of a second page may be displayed together on the display unit 151 (in operation S110).

This operation may occur when the mobile terminal 100 is operating in a page mode, as compared to a different mode, such as a scroll mode. In the page mode, a page of digital content may correspond to a page of memory corresponding to a size of the display. This differs from a scroll mode in which less than (or more than) a page of memory may be utilized.

The digital contents may include one of an electronic document (including a plurality of pages), a menu screen (including a plurality of pages), and/or a home screen (including a plurality of pages).

The display unit 151 may simultaneously display, in the page mode, an entirety of the first page and a portion of the second display. The first page may be a page that the user is currently viewing, and the second page may be a previous page (or a next page) compared to the page that the user is currently viewing. The display unit 151 may simultaneously display the entirety of the first page and the entirety of the second page.

In operation S120, a 3D depth value (or perceived 3D depth value) of at least one of the first page and the second page may be controlled such that the first page of the digital contents has a 3D depth value different from a 3D depth value of the second page.

When the digital contents display function is executed, the controller 180 may control a 3D depth value of at least one of the first page and/or the second page. Thus, the first page may be displayed on the display unit 151 having a different 3D depth value.

In a state in which a 2D image including the first and second pages is displayed on the display unit 151, when a touch input for changing the 2D image into a 3D image is sensed, the controller 180 may control or adjust a 3D depth value of at least one of the first page and the second page while changing (or adjusting) the 2D image to a 3D image. Thus, the first and second pages having different 3D depth values may be displayed on the display unit 151.

In a state in which a perceived 3D image including first and second pages is displayed on the display unit 151, when a touch input (such as a proximity touch) for changing a 3D depth value of at least one of the first page and the second page is sensed (such as by a proximity sensor), the controller 180 may control a 3D depth value of at least one of the first page and the second page. Thus, the first and second pages having the changed 3D depth value may be displayed on the display unit 151. As one example, the proximity sensor 141 may recognize a proximity touch of the first page, and the controller 180 may control a 3D depth value of the first page.

Since the entirety of the page of the digital contents that the user is currently viewing and at least a portion of a previous page (or a next page) are displayed together on a single screen, the user may view the portion of the previous page (or the next page) together with the current page.

The page that the user is currently viewing may be emphasized based on a perceived 3D effect provided to the page that the user is currently viewing. Resource such as an amount of computation, a memory, power, and/or the like of the mobile terminal 100 may be effectively used in comparison to an example in which a 3D depth value is provided to all the pages.

Figure 5A:
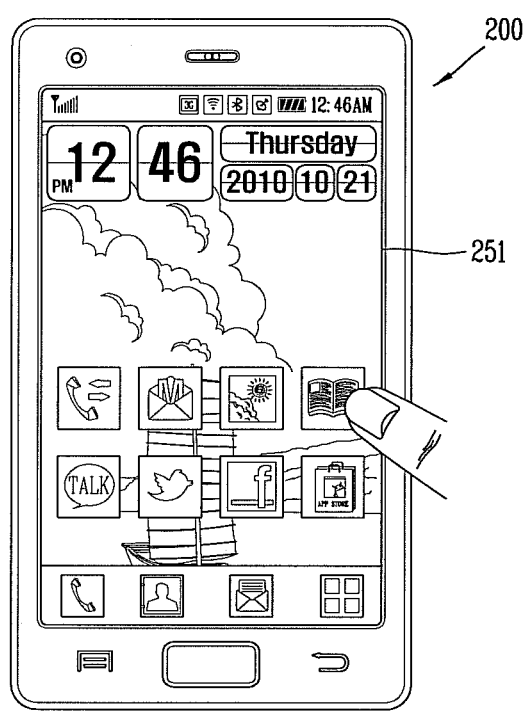
FIGS. 5A, 5B, 6A, 6B, 7A and 7B are views of operational examples of a mobile terminal.
Figure 5B:
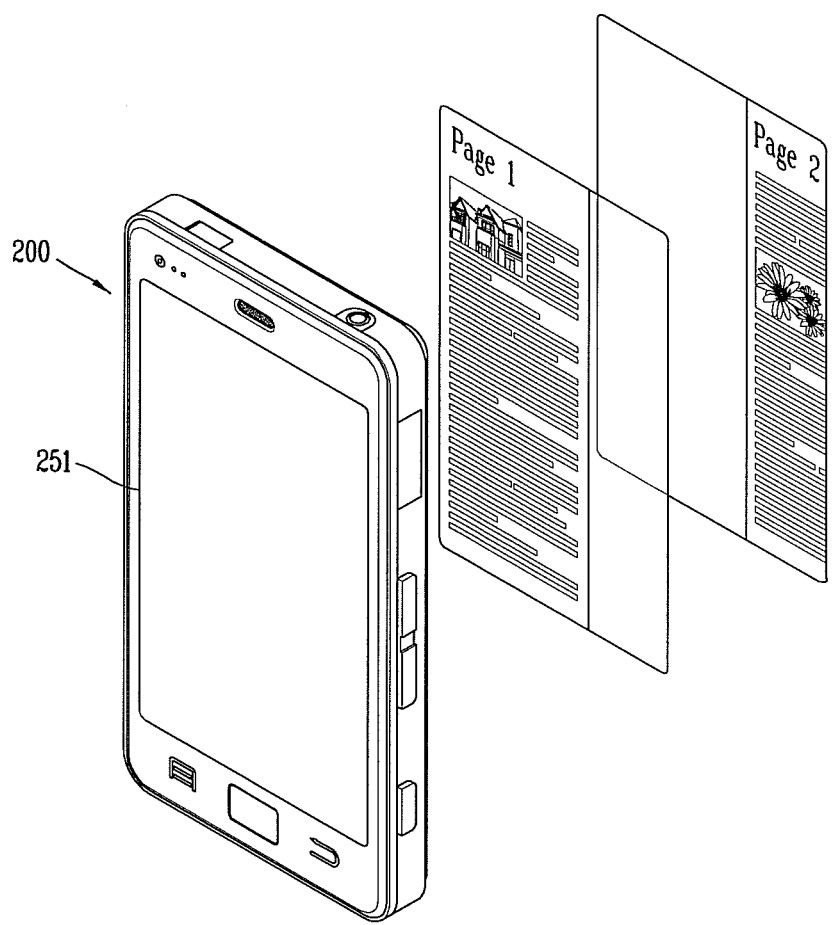

FIGS. 5A and 5B are views of operational examples of the mobile terminal. Other embodiments, views and configurations may also be provided.

FIGS. 5A-5B show a mobile terminal 200, which may include components of the mobile terminal 100 discussed above. The mobile terminal 200 may include a display unit 251 (corresponding to the display unit 151) and the controller 180.

The display unit 251 may display a plurality of objects on a background image. When a touch input (including a proximity touch) applied to an object (corresponding to an execution of a digital contents display function) is sensed, the controller 180 may execute the digital contents display function based on the touch input.

While executing the digital contents display function, the controller 180 may control a 3D depth value of at least one of the first page and/or the second page. Accordingly and as shown in FIG. 5B, the first page (Page 1) may be displayed as being less recessed from the mobile terminal 200 (or the display unit 251). The second page (Page 2) may be displayed as being further recessed (than the first page) from the mobile terminal 200.

Figure 6A:
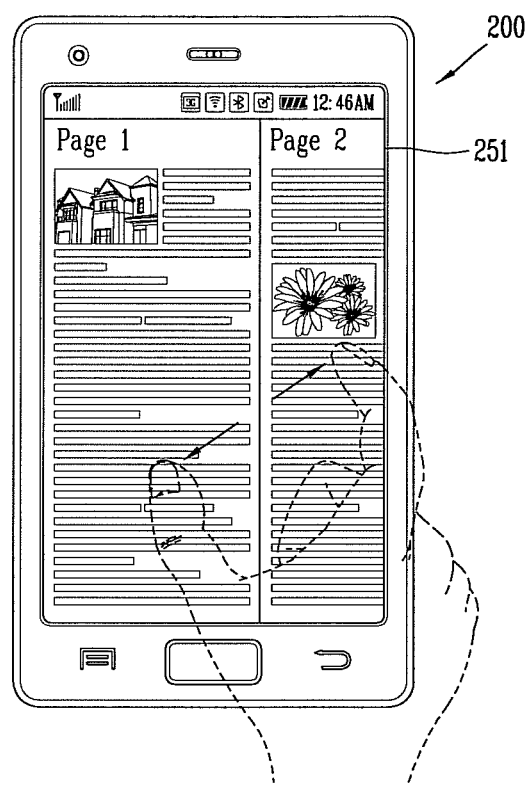
Figure 6B:
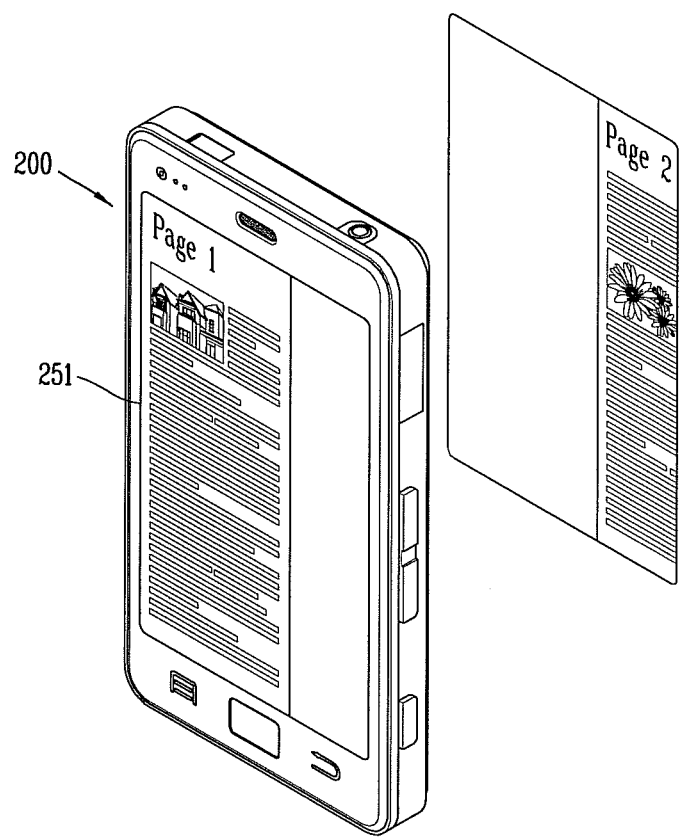

FIGS. 6A and 6B are views of operational examples of the mobile terminal 200. Other embodiments, views and configurations may also be provided.

The mobile terminal 200 may include the display unit 251 and the controller 180.

Referring to FIGS. 6A and 6B, in a state in which an image (including the entirety of a first page and a portion of a second page) is displayed on the display unit 251, when a touch input is sensed (e.g. when a pinch-in gesture is sensed), the controller 180 may change a 2D image to a perceived 3D image in response to the touch input.

While changing the 2D image to the perceived 3D image, the controller 180 may control (or adjust) a 3D depth value of at least one the first page and/or the second page. Thus, and as shown in FIG. 5B, the first page may be displayed to further protrude (relative to the second page) to outside of the mobile terminal 200 (or the display unit 251). The first page (Page 1) may appear to protrude a first amount from the display unit 251, and the second page (Page 2) may appear a second amount from the display unit, where the first amount is greater than the second amount. In another embodiment, the second page may be considered to be on the display unit 251, and the first page would appear to protrude from the display unit 251.

An example embodiment may be that a 3D depth value of each of the first page and the second page is a negative number (i.e., an example in which a 3D image including the first page and the second page and the pages are displayed to protrude to outside of the mobile terminal 200 based on the display unit 251). This example is merely illustrative.

Another example embodiment may also be that a 3D depth value of each of the first page and the second page is a positive number (i.e., when a 3D image including the first page and the second page are seen to be recessed from an interior of the mobile terminal 200 based on the display unit 251).

When the user views a page that includes a perceived 3D image in a form that protrudes to outside of the mobile terminal 200 based on the display unit 251, a page seen at a shorter distance to a user (or a page seen to be closer) may have a 'great 3D depth value' and a page seen at a longer distance to the user (or a page seen to be farther) may have a 'small 3D depth value'.

Figure 7A:
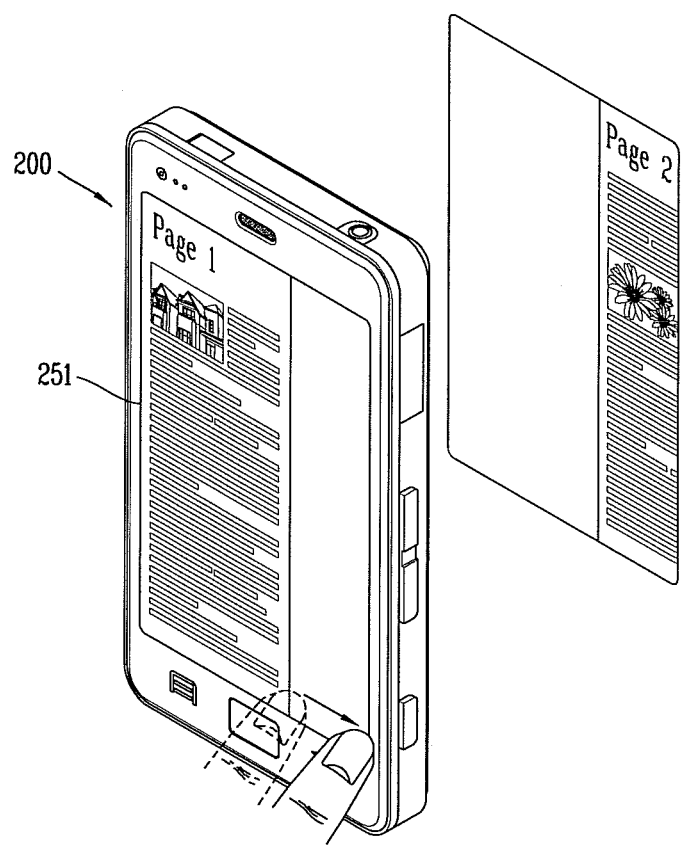
Figure 7B:
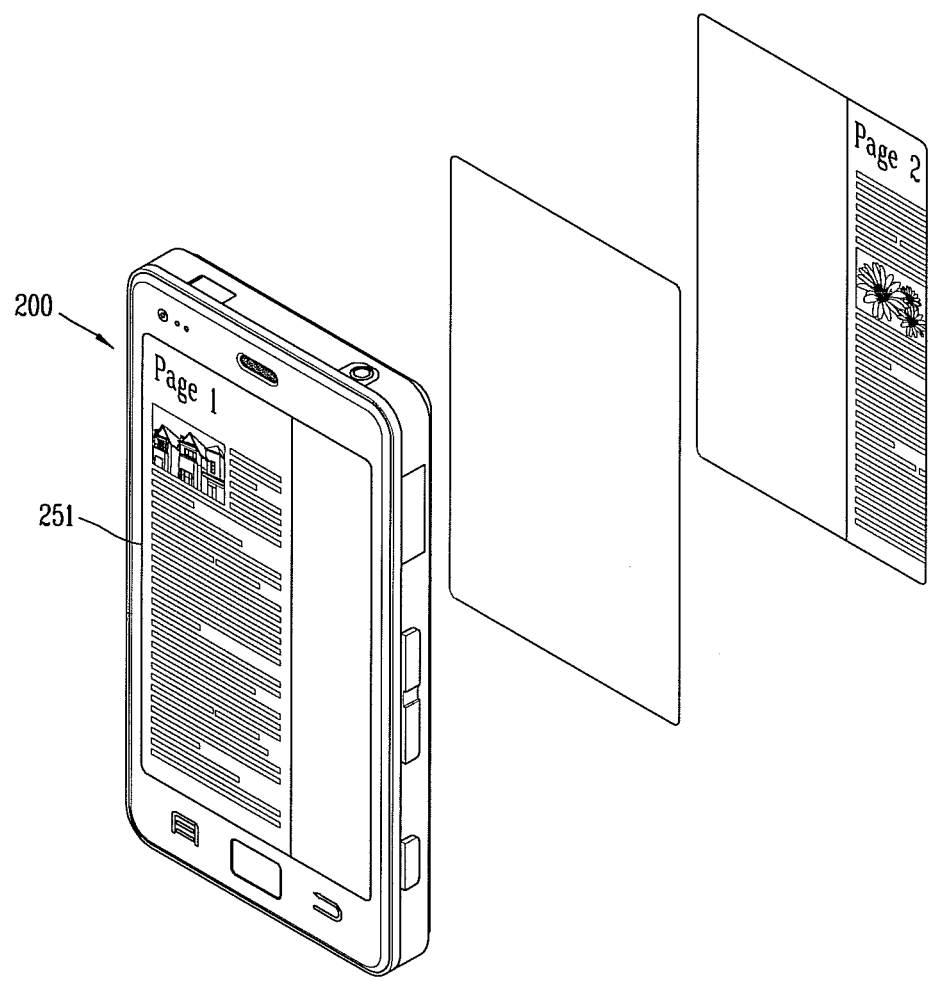

FIGS. 7A and 7B are views of operational examples of the mobile terminal 200. Other embodiments, views and configurations may also be provided.

The mobile terminal 200 may include the display unit 251 and the controller 180.

The display unit 251 may display a 3D image including first and second pages having different 3D depth values. When a touch input (such as a proximity touch) applied to at least one of the first page and the second page is sensed, the controller 180 may control a 3D depth value of the touched page based on a degree of the applied touch (such as the proximity touch).

When a touch input (such as a proximity touch) with respect to at least one of the first page and the second page is sensed, a degree of the applied touch with respect to the touched page may be detected. The controller 180 may determine a degree of the applied touch by detecting at least one of a change of a touch operation and a duration from a time at which the touch input starts and a time at which the touch input is released.

The degree of the applied touch may be a period of time during which a touch is maintained, touched times, a dragged length, and/or the like, and/or may be a distance value between first and second touched points.

For example, as shown in FIG. 7A, when a touch input (such as a proximity touch) applied to a first page is sensed (for example, when a drag gesture in a first direction (from left to right) is sensed), the controller 180 may increase a 3D depth value of the first page.

Although an example is shown in which the drag gesture is sensed as a touch input (such as a proximity touch input) with respect to the first page, types of touch inputs (such as proximity touch inputs) with respect to the first page are not limited thereto. For example, when a single tap gesture, a flick gesture, a pinch-in gesture, a pinch-out gesture, and/or the like are sensed, the controller 180 may increase the 3D depth value of the first page.

Thus, as shown in FIG. 7B, the first page may be displayed to further protrude to outside of the mobile terminal 200 as compared to the first page in FIG. 7A. Although not shown, when the user drags (or proximity drags) the first page longer in a first direction, the first page may be displayed to further protrude to outside of the mobile terminal 200. A progress bar may also be displayed to indicate a degree of the touch applied to the display unit 251.

When a drag gesture (or proximity drag gesture) in a second direction (from right to left) with respect to the first page is sensed, the controller 180 may reduce a 3D depth value of the first page.

Figure 8:
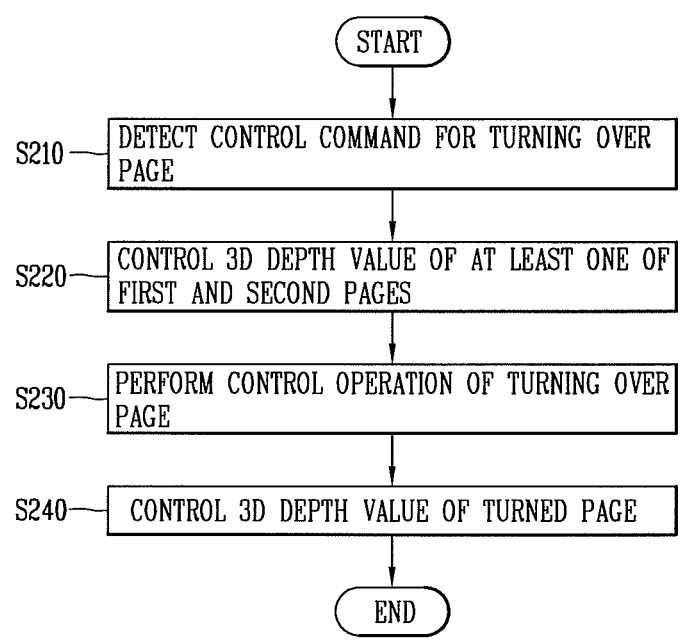
FIG. 8 is a flow chart of a control method of a mobile terminal according to an example embodiment.

FIG. 8 is a flow chart of a control method of the mobile terminal according to an example embodiment. Other embodiments and operations may also be provided.

The mobile terminal may include the display unit 151 and the controller 180.

Referring to FIG. 8, a control command for turning over a page of digital contents may be sensed in operation S210.

The display unit 151 may simultaneously display an entirety of the first page and a portion of the second page. After one of the first page and the second page is selected when a drag input is received, the controller 180 may detect a control command for turning over a page of the digital contents.

A 3D depth value of at least one of the first page and the second page may be controlled or adjusted in operation S220.

When any one of the first page and the second page is selected, the controller 180 may control (or adjust) a 3D depth value of the other one of the first page and the second page such that the first and second pages have a same 3D depth value. In order to increase or decrease a difference between the 3D depth values of the first and second pages, a 3D depth value of at least one of the first page and the second page may be controlled (or adjusted).

A controlling operation of turning over a page of the digital contents is performed in operation S230.

Pages displayed in a first area or region (hereinafter also referred to as a first screen region) in which the entirety of a page is displayed and on a second area or a region (hereinafter also referred to as a second screen region) in which a portion of a page is displayed may change. The controller 180 may change or adjust a page displayed in the first are (or first screen region) to a second page, and the controller 180 may change a page displayed in the second area (or the second screen region) to a third page.

A 3D depth value of the turned page may be controlled or adjusted in operation S230.

The controller 180 may control a 3D depth value of a second page such that the second page displayed in the first screen region (or first area) has a 3D depth value different from that of the first page, which was displayed in the first screen region (or first area) before the page was turned over. The controller 180 may control the 3D depth value of the page displayed in the first screen region (or first area) based on a number of pages displayed in the first screen region (or first area).

In a state in which the first page is displayed on the display unit 151, when the first page is selected and a drag input is subsequently received, the controller 180 may detect a control command for turning over a page. The controller 180 may make the first page disappear and display the second page on the display unit 151. The controller 180 may control a 3D depth value of the second page such that the second page has a 3D depth value different from the first page.

As described above, since the 3D depth value of the pages the user is currently viewing is controlled based on a number of pages that the user is currently viewing, the user may intuitively recognize a rate of the number of pages that have been turned over from among the entire pages of the digital contents.

Figure 9A:
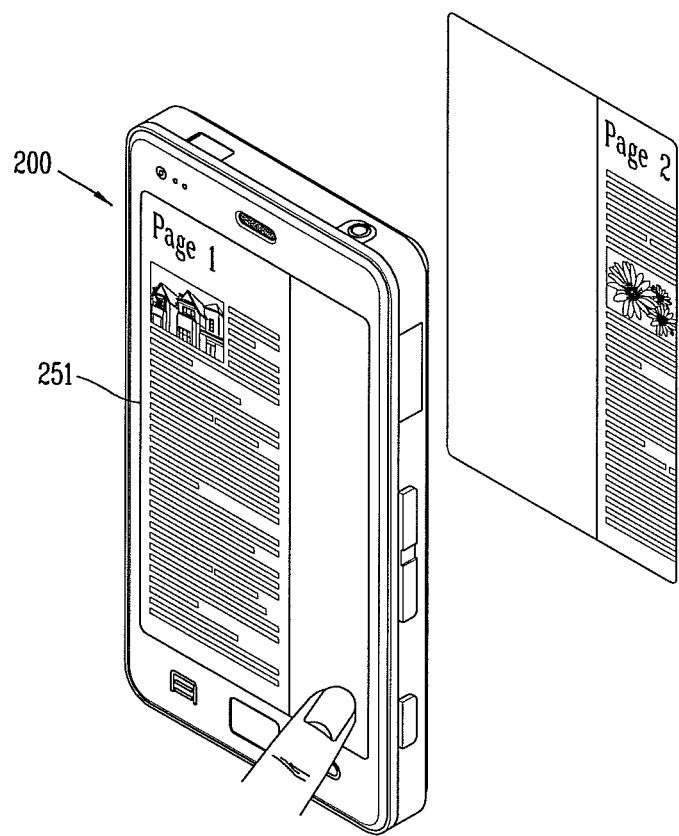
FIGS. 9A to 9C are views of operational examples of a mobile terminal.
Figure 9B:
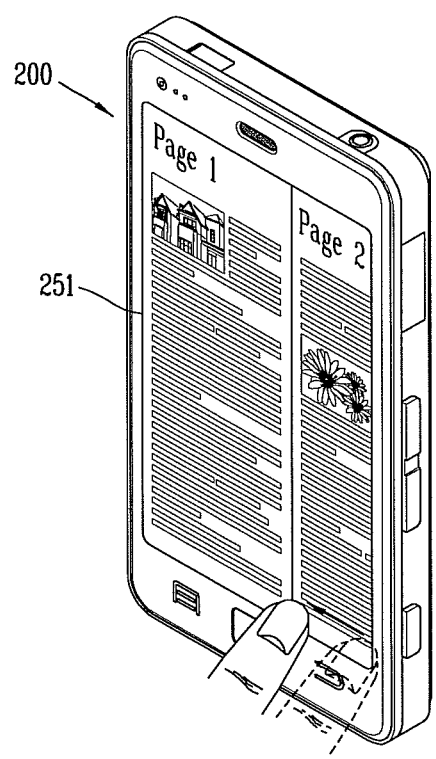
Figure 9C:
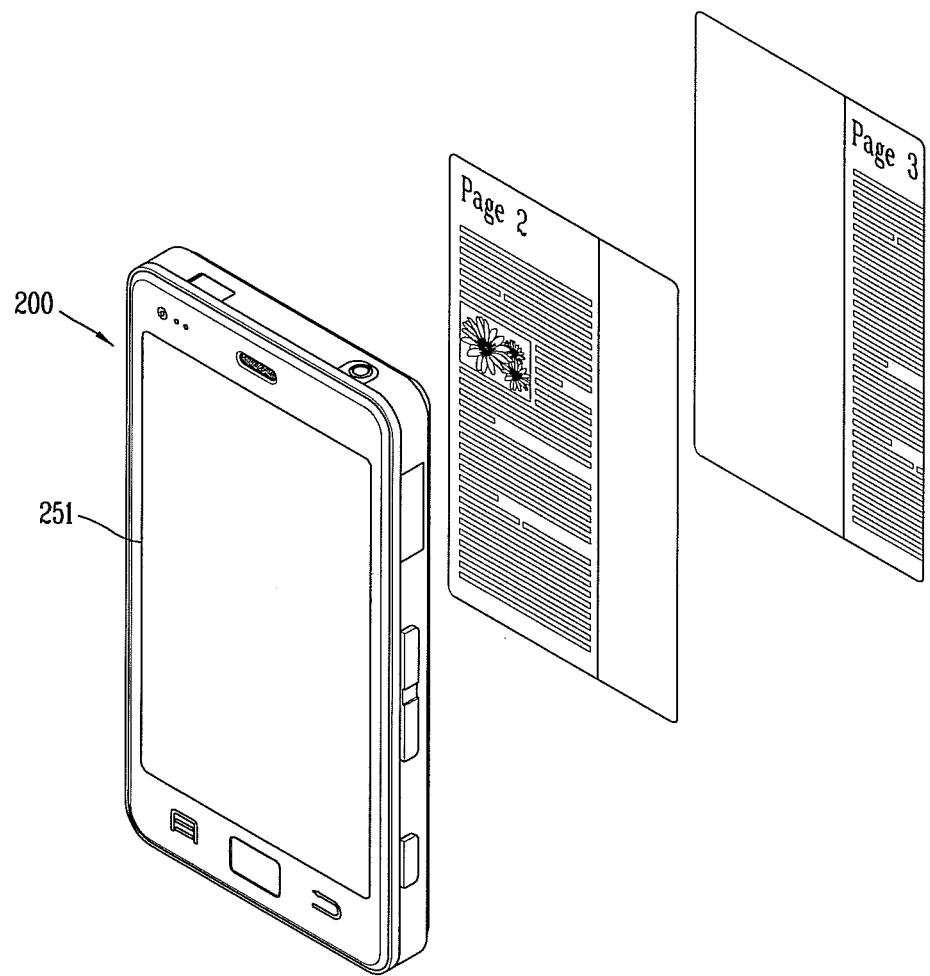

FIGS. 9A to 9C are views of operational examples of the mobile terminal 200. Other embodiments and operations may also be provided.

The mobile terminal 200 may include the display unit 251 and the controller 180.

The display unit 251 may display a 3D image (or perceived 3D image) including first and second pages having different 3D depth values. When a touch input (such as a proximity touch) applied to at least one of the first and second pages in order to turn over a page is sensed, the controller 180 may perform a controlling operation in relation to turning of a page.

For example, as shown in FIG. 9A, in a state in which first and second pages are displayed together on the display unit 251, when a selective input applied to the second page is sensed, the controller 180 may instantly control (or adjust) a 3D depth value of at least one of the first page and the second page.

As shown in FIG. 9B, the controller 180 may instantly control or adjust a 3D depth value of the first page such that the first and second pages have the same 3D depth value. Accordingly, the first and second pages having the same 3D depth value may be displayed on the display unit 251.

After a selective input with respect to the second page is sensed, when a drag input in a second direction (from right to left) is sensed, the controller 180 may perform a controlling operation to turning over to the next page. As shown in FIG. 9C, the controller 180 may change a page displayed in the first screen region to a second page, and may change a page displayed in the second screen region to a third page.

The second page displayed in the first screen region (or first area) may be displayed to have a 3D depth value different from the first page which was displayed in the first screen region (or first area) before the page was turned. As shown in FIG. 9C, the second page displayed in the first screen region may be displayed to further protrude to the outside of the mobile terminal 200 based on the display unit 251, relative to the first page that was displayed in the first screen region before the page was turned.

Figure 10:
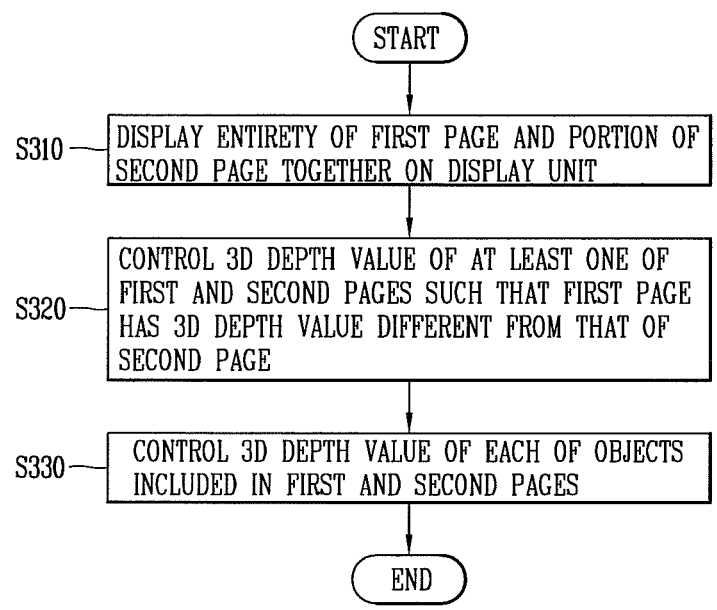
FIG. 10 is a flow chart of a control method of a mobile terminal according to an example embodiment.

FIG. 10 is a flow chart of a control method of a mobile terminal according to an example embodiment. Other embodiments and operations may also be provided.

The mobile terminal 200 may include the display unit 251, the memory 160, and the controller 180.

Referring to FIG. 10, an entirety of a first page of digital contents and at least a portion of a second page may be displayed together on the display unit 151 in operation S310.

The display unit 151 may simultaneously display the entirety of the first page and a portion of the second page. The display unit 151 may also simultaneously display the entirety of the first page and the entirety of the second page.

A 3D depth value at least one of the first page and the second page is controlled (or adjusted) such that the first page of the digital contents has a 3D depth value different from the second page in operation S320. Thereafter, a 3D depth value of each of objects included in the first and second pages is controlled (or adjusted) to have a 3D depth value different from the base in operation S330.

The first page and the second page may include a base and a plurality of objects displayed on the base. The base may refer to a portion excluding the objects in each page. The object may include an icon, a widget, an application execution menu, a thumbnail image, and/or the like.

The controller 180 may control 3D depth values of the respective objects included in the first and second pages such that they have a 3D depth value different from the base. Accordingly, the first and second pages having different 3D depth values, and the base and the objects having different 3D depth values included in the first and second pages, respectively, may be displayed on the display unit 151.

Attribute information (metadata) of each of the objects may be stored in the memory 160. The attribute information may refer to data provided to contents. The attribute information may include at least one of a position and the substance of the contents, information regarding a drafter (or writer), conditions for the right, usage conditions, and/or usage history. The attribute information of each object includes quality information of each of the objects, and may include information regarding use frequency, information regarding recent usage history, and/or the like.

The controller 180 may generate priority information such that priority levels of the objects are determined based on the attribute information of each of the objects. Thereafter, the controller 180 may control a 3D depth value of each of the objects based on the priority information.

Since the objects included in the page of the digital contents are displayed to have a 3D depth value different from the base on the display unit 151, the objects may be emphasized. Accordingly, the user's intuitive recognition with respect to the objects may be enhanced.

Figure 11A:
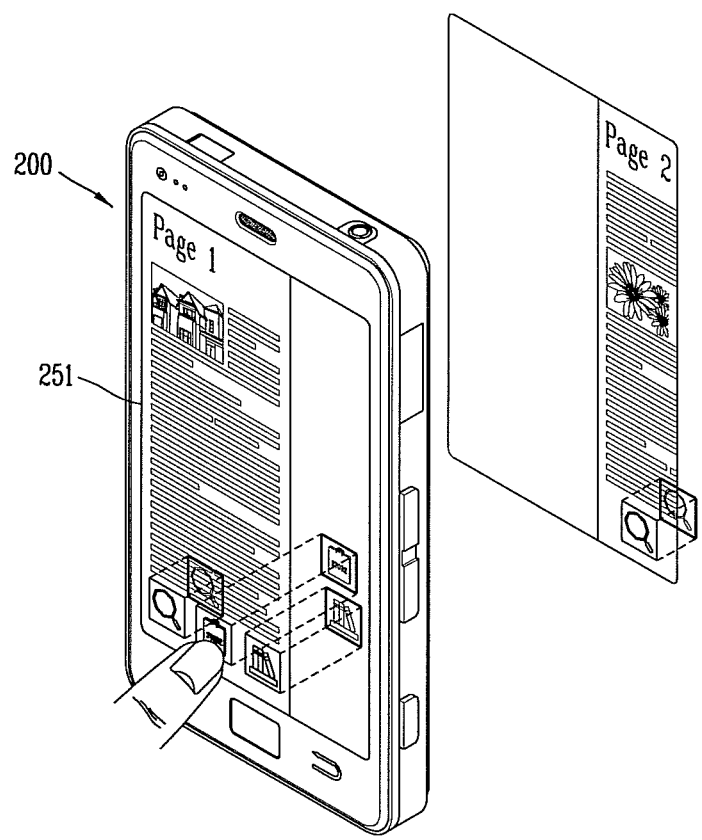
FIGS. 11A and 11B are views of operational examples of a mobile terminal.
Figure 11B:
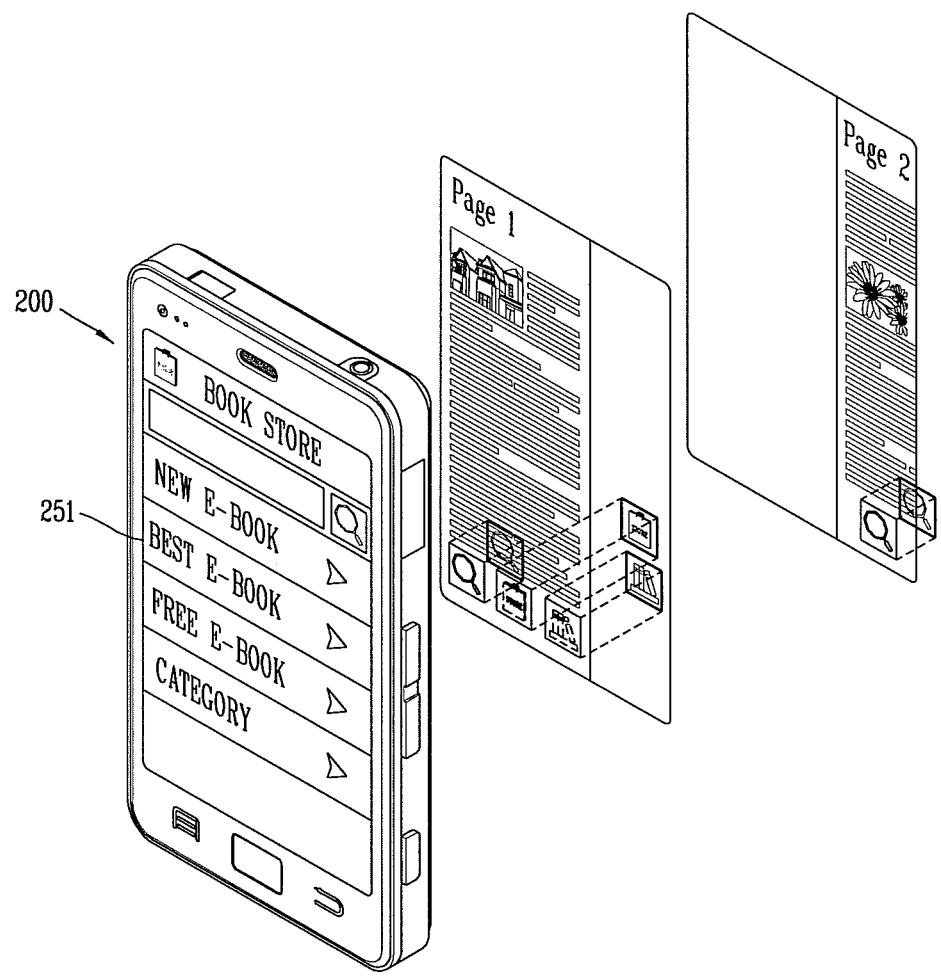

FIGS. 11A and 11B are views of operational examples of the mobile terminal 200. Other embodiments and operations may also be provided.

The mobile terminal 200 may include the display unit 251, the memory 160, and the controller 180. Hereinafter, for ease of description, an electronic document, among digital contents, may be described as an example.

The display unit 251 may display a 3D image including first and second pages having different 3D depth values. The display unit 251 may display a base and objects having different 3D depth values included in the first and second pages, respectively.

As shown in FIG. 11A, the controller 180 may control 3D depth values of applications (hereinafter referred to as a search application, online bookstore application, and electronic document list application) corresponding to 'search', 'online bookstore', and 'electronic document list', respectively, included in a first page, such that they have different 3D depth values.

The controller 180 may provide priority in order starting from the online bookstore application, the electronic document list application, and search application, based on the attribute information of each of the applications stored in the memory 160. Accordingly, the 3D depth values of the applications may be controlled such that the online bookstore application has a greatest 3D depth value while the search application has the smallest 3D depth value.

When a touch input (such as a proximity touch) applied to at least one of the objects (e.g., the online bookstore application) is sensed, the controller 180 may execute an online bookstore access function in response to the touch input.

When a touched application is executed, the controller 180 may control or adjust a 3D depth value of at least one of the application execution screen and the touched application such that the application execution screen and the touch application have different 3D depth values.

For example, as shown in FIG. 11B, the controller 180 may control a 3D depth value of an online bookstore access screen such that the online bookstore access screen and the online bookstore application have different 3D depth values. Thus, the online bookstore access screen may be displayed to further protrude (relative to the online bookstore application) to outside of the mobile terminal 200 based on the display unit 251.

Figure 12:
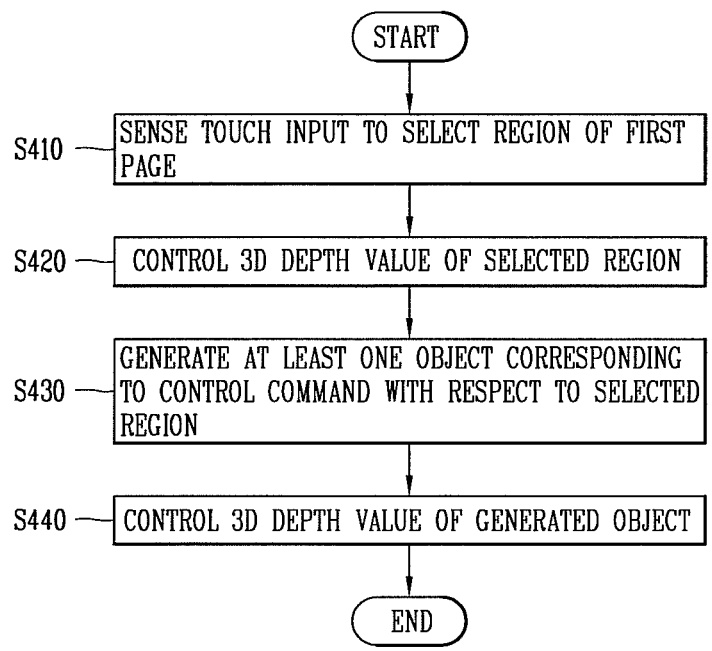
FIG. 12 is a flow chart of a control method of a mobile terminal according to an example embodiment.

FIG. 12 is a flow chart of a control method of the mobile terminal according to an example embodiment. Other embodiments and operations may also be provided.

The mobile terminal 100 may include the display unit 151 and the controller 180.

Referring to FIG. 12, a touch input (such as a proximity touch input) applied to a first page in order to select a region may be sensed in operation S410.

The display unit 151 may simultaneously display the entirety of a first page and a portion of a second page. When a touch input applied to the first page in order to select a region (or area) is sensed, the controller 180 may select a region of the first page in response to the touch input.

A 3D depth value of the selected region may be controlled in operation S420.

The controller 180 may control a 3D depth value of at least one of the selected area or region (hereinafter referred to as a partial page region) and the first page such that the partial page region and the first page have different 3D depth values.

Thereafter, at least one object corresponding to a control command with respect to the partial page region may be generated in operation S430. A 3D depth value of the generated object may be controlled or adjusted in operation S440.

The controller 180 may control or adjust a 3D depth value of at least one of the generated object and the partial page region such that the generated object and the partial page region have different 3D depth values. The controller 180 may generate priority information such that priority levels of the objects are determined based on attribute information of each of the objects. The controller 180 may control or adjust a 3D depth value of each of the objects based on the priority information.

As described above, since a scrap page having a 3D depth value different from that of the original page of an electronic document may be displayed together with the original page on the display unit, the user may easily compare currently displayed original pages of the electronic document and the scrap pages. The user's intuitive recognition with respect to the scrap pages may be enhanced.

Figure 13A:
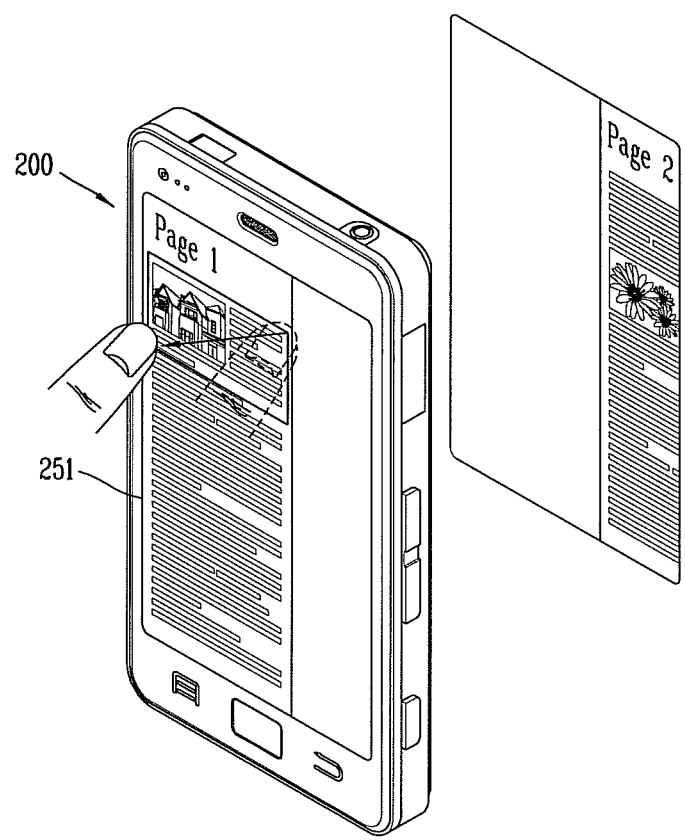
FIGS. 13A to 13C are views of operational examples of a mobile terminal.
Figure 13B:
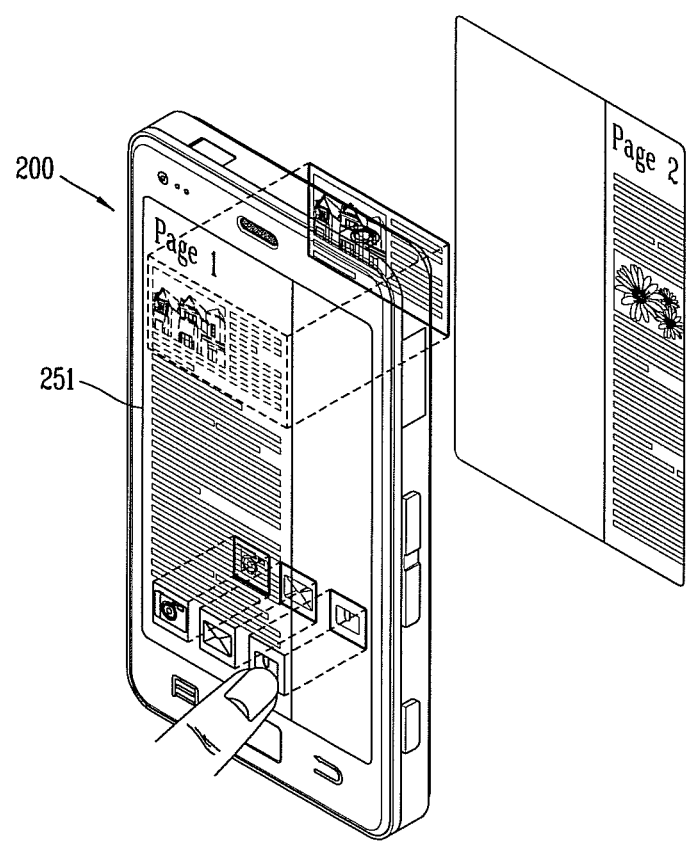
Figure 13C:
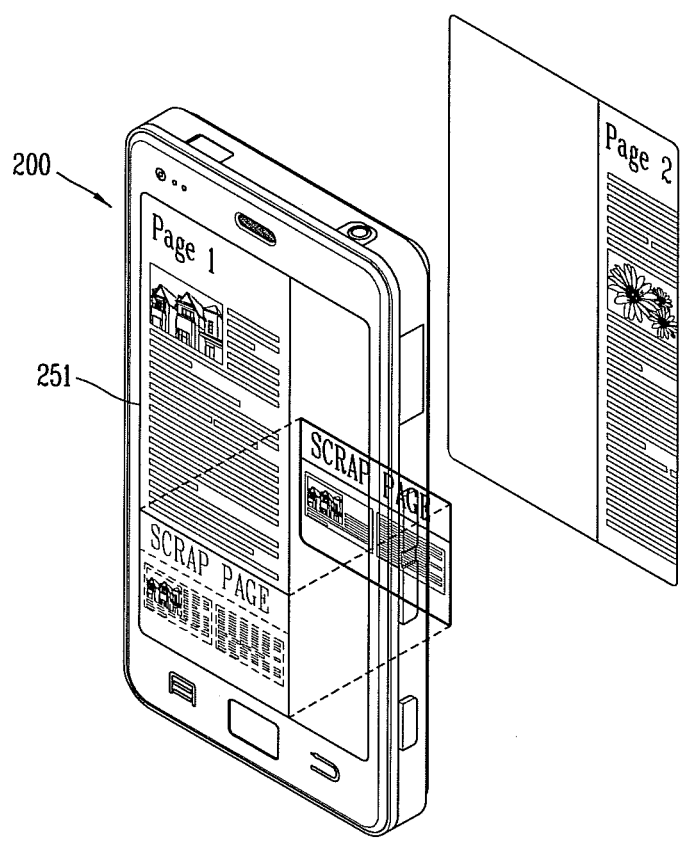

FIGS. 13A to 13C are views of operational examples of the mobile terminal 200. Other embodiments and views may also be provided.

The mobile terminal 200 may include the display unit 251 and the controller 180.

The display unit 251 may display a 3D image including first and second pages having different 3D depth values. As shown in FIG. 13A, when a touch input (such as a proximity touch input) applied to the first page in order to select a region or area is sensed (e.g., when a drag gesture in a diagonal direction is sensed), the controller 180 may select a region of the first page in response to the touch input.

The controller 180 may control (or adjust) a 3D depth value of at least one of the selected area or region (hereinafter referred to as a partial page region) and the first page such that the partial page region and the first page have different 3D depth values.

For example, as shown in FIG. 13B, the controller may control a 3D depth value of the partial page region such that the partial page region and the first page have different 3D depth values. Accordingly, the partial page region may be displayed to further protrude (relative to the first page) to outside of the mobile terminal 200 based on the display unit 251.

The controller 180 may generate at least one object for executing a function with respect to the partial page region. The controller 180 may control (or adjust) a 3D depth value of at least one of the generated object and the partial page region such that the generated object and the partial page region have different 3D depth values.

For example, as shown in FIG. 13B, applications (hereinafter referred to as a capture application, an e-mail application, a scrap page application) corresponding to the generated objects, e.g., 'capture', e-mail transmission', and 'scrap page generation', respectively, may be displayed to further protrude (relative to the partial page region) to the outside of the mobile terminal 200 based on the display unit 251.

When a touch input (such as a proximity touch input) applied to at least one of the objects (e.g., a scrap page application), the controller 180 may execute a scrap page generation function with respect to the partial page region in response to the touch input.

For example, the controller 180 may display a scrap page in a different area or region (hereinafter referred to as a fourth screen region or further area) adjacent to the region (hereinafter referred to as a third screen region or third area) in which the first page is displayed. The controller 180 may control a 3D depth value of at least one of the scrap page and the first page such that the scrap page and the first page have different 3D depth values.

Accordingly, as shown in FIG. 13C, the scrap page may be displayed to further protrude (relative to the first page) to outside of the mobile terminal 200 based on the display unit 251. The scrap page may be displayed in the form of the partial page region without a change in the size thereof, or may be reduced to be displayed in the form of a thumbnail image.

The controller 180 may generate an effect that the partial page region displayed in the third screen region (or third area) is torn apart from the first page, while displaying the scrap page in the fourth screen region (or fourth area).

Embodiments may provide a mobile terminal capable of discriminately displaying two pages of digital contents on a screen.

A mobile terminal may include a display unit and a controller. The display unit may be configured to display a first page of digital contents and at least a portion of a second page different from the first page together. A controller may control a three-dimensional (3D) depth value of at least one of the first and second pages such that the first page can have a 3D depth (or perceived 3D depth value) different from that of the second page in a state in which the first and second pages are displayed together.

The digital contents may include at least one of an electronic document, a menu, and a home screen.

The display unit may be configured to display a 2D image and a 3D image, separately. When the 2D image is converted into a 3D image, the controller may control a 3D depth value of at least one of the first and second pages such that the first page has a 3D depth value different from that of the second page.

The display unit may be configured to allow for a touch input including a proximity touch). When a touch input applied to at least one of the first and second pages is sensed, the controller may control a 3D depth value of the touched page based on a degree of the applied touch (or proximity touch).

The controller may determine a degree of the applied touch by detecting at least one of a change of a touch operation and a duration from a timing at which the touch input starts and a timing at which the touch input is released.

The first page may be displayed in a first screen region. At least a portion of the second page may be displayed in a second screen region. When a control command for turning over a page of the digital contents is detected, the controller may change a page displayed in the first screen region to a second page, and the controller may control a 3D depth value of the second page such that the second page has a 3D depth value different from that of the first page.

The 3D depth value of the page displayed in the first screen region may be controlled based on the number of pages displayed in the first screen region.

When a drag input (or proximity drag input) is received after any one of the first and second pages is selected, the controller may detect a control command for turning over a page of the digital contents, and when any one of the first and second pages is selected, the controller may control the 3D depth value of at least one of the first and second pages.

When any one of the first and second pages is selected, the controller may control the other 3D depth value such that the first and second pages have the same 3D depth value.

The first and second pages may include a base and a plurality of objects displayed on the base, respectively. The controller may control a 3D depth value of each of the objects such that the objects have a 3D depth value different from that of the base.

The mobile terminal may further include a memory configured to store attribute information of each of the attributes. The controller may generate priority information to determine priority levels of the objects and control the 3D depth value of each of the objects based on the priority information.

The plurality of objects may correspond to the plurality of applications, respectively. When a touch input with respect to at least one of the objects is sensed, the controller may execute an application corresponding to the touched object and control a 3D depth value of at least one of the application execution screen and the touched object such that the application execution screen and the touched object have different 3D depth values.

When a touch input applied to a first page in order to select a region is sensed, the controller may display the selected region having a 3D depth value different from that of the first page on the display unit.

The controller may generate at least one object corresponding to a control command with respect to the selected region, and the controller may display the generated object having a 3D depth value different from that of the selected region on the display unit.

The generated object may include an object corresponding to generation of a scrap page. When a scrap page corresponding to the selected region is generated, the controller may set third and fourth screen regions and display the first page and the scrap page in the third and fourth screen regions, respectively.

The controller may control a 3D depth value of at least one of the third and fourth screen regions such that the third and fourth screen regions have different 3D depth values.

A control method of a mobile terminal may include: displaying a first page of digital contents and at least a portion of a second page different from the first page together on a display unit. The method may also include controlling (or adjusting) a 3D depth value of at least one of the first and second pages such that the first page has a 3D depth value different from that of the second page in a state in which the first and second pages are displayed together.

The digital contents may include at least one of an electronic document, a menu, and a home screen.

The controlling of a 3D depth value of at least one of the first and second pages may include: when a 2D image is changed into a 3D image, controlling a 3D depth value of at least one of the first and second pages such that the first page has a 3D depth value different from that of the second page.

The controlling of a 3D depth value of at least one of the first and second pages may include: when a touch input applied to at least one of the first and second pages is sensed, controlling a 3D-depth value of the touched page based on a degree of the applied touch.

The first page may be displayed in a first screen region and at least a portion of the second page may be displayed in a second screen region. The control method of the mobile terminal may further include: when a control command for turning over a page of the digital contents is detected, changing a page displayed in the first screen region to the second page, and controlling a 3D depth value of the second page such that the second page has a 3D depth value different from that of the first page.

The 3D depth value of the page displayed in the first screen region may be controlled based on the number of pages displayed in the first screen region.

The control method of a mobile terminal may further include: when a drag input is received after any one of the first and second pages is selected, detecting a control command for turning over a page of the digital contents; and when any one of the first and second pages is selected, controlling a 3D depth value of at least one of the first and second pages.

The controlling of a 3D depth value at least one of the first and second pages may include: when any one of the first and second pages is selected, controlling a 3D depth value of the other such that the first and second pages have the same 3D depth value.

The first and second pages may include a base and a plurality of objects displayed on the base, respectively. The control method of a mobile terminal may further include: controlling a 3D depth of each of the objects such that the objects have a 3D depth value different from that of the base.

The controlling of the 3D depth value of each of the objects may include generating priority information to determine priority levels of the objects based on attribute information of each of the objects, and controlling a 3D depth value of each of the objects based on the priority information.

The method may further include: when a touch input (such as a proximity touch input) applied to a first page in order to select a region is sensed, displaying the selected region having a 3D depth value different from that of the first page on the display unit.

The method may further include: generating at least one object corresponding to a control command with respect to the selected region, and displaying the generated object having a 3D depth value different from that of the selected region on the display unit.

Embodiments may be implemented as codes that can be read by a processor in a program-recorded medium. The processor-readable medium may include a ROM, a RAM, a CD-ROM, a magnetic tape, a floppy disk, an optical data storage device, and the like. The processor-readable medium also includes implementations in the form of carrier waves or signals (e.g., transmission via the Internet).

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A mobile terminal comprising:
   a display to simultaneously display, in a page mode, a first page of digital contents on a first area of the display and at least a portion of a second page of digital contents different from the first page on a second area of the display, wherein the display is configured to display any one of a two-dimensional (2D) image and a three-dimensional (3D) image; and
   a controller to adjust a three-dimensional (3D) depth value of at least one of the first page and the second page when the 2D image is converted to the 3D image, such that the first page has a perceived 3D depth different from a perceived 3D depth of the second page while the first page and the second page are simultaneously displayed on the display.

2. The mobile terminal of claim 1, wherein the digital contents include one of an electronic document, a menu, and a home screen.

3. The mobile terminal of claim 1, wherein the display to receive a proximity touch input, and
   in response to receiving a proximity touch input applied to the first page, the controller adjusts a 3D depth value of the first page based at least in part on a degree of the touch input.

4. The mobile terminal of claim 3, wherein the controller determines the degree of the touch input based on a change of a touch operation or a time duration from a first time to a second time, the first time being a time when the touch input starts and the second time being a time at which the touch input is released.

5. The mobile terminal of claim 1, wherein in response to receiving a control command for turning over a page of the digital contents, the controller changes a page displayed in the first area to a second page, and the controller controls a 3D depth value of the second page such that the second page has a perceived 3D depth different from the perceived 3D depth of the first page.

6. The mobile terminal of claim 5, wherein the 3D depth value of the page displayed in the first area is adjusted based at least in part on a number of pages displayed in the first area.

7. The mobile terminal of claim 1, wherein in response to receiving a drag input after one of the first page and the second page is selected, the controller detects a control command for turning over a page of the digital contents, and
   in response to selecting one of the first page and the second page, the controller controls the 3D depth value of at least one of the first page and the second page.

8. The mobile terminal of claim 7, wherein when one of the first page and the second page is selected, the controller controls the 3D depth value of the other one of the first page and the second page such that the first page and the second page have a same 3D depth value.

9. The mobile terminal of claim 1, wherein the first page and the second page each separately include a base and a plurality of objects displayed on the base, and
   the controller controls a 3D depth value of each of the objects such that the objects have a 3D depth value different from the 3D depth value of the base.

10. The mobile terminal of claim 9, further comprising:
    a memory to store attribute information,
    wherein the controller determines priority levels of the objects, and the controller controls the 3D depth value of each of the objects based at least in part on the determined priority levels.

11. The mobile terminal of claim 10, wherein the plurality of objects correspond to a plurality of applications, respectively, and
    in response to sensing a touch input with respect to one of the objects, the controller executes an application corresponding to the touched object and adjusts a 3D depth value of one of an application execution screen and the touched object such that the application execution screen and the touched object have different 3D depth values.

12. The mobile terminal of claim 1, wherein in response to sensing a touch input corresponding to the first page in order to select a region, the controller displays, on the display, the selected region having a 3D depth value different from the 3D depth value of the first page.

13. The mobile terminal of claim 12, wherein the controller generates one object corresponding to a control command with respect to the selected region, and the controller displays, on the display, the generated object having a 3D depth value different from the 3D depth value of the selected region.

14. The mobile terminal of claim 13, wherein the generated object includes an object corresponding to generation of a scrap page, and
    when a scrap page corresponding to the selected region is generated, the controller sets third and fourth screen regions and displays the first page and the scrap page in the third and fourth screen regions, respectively.

15. A display method of a mobile terminal, the method comprising:
    simultaneously displaying, in a page mode, a first page of digital contents on a first area of a display and at least a portion of a second page of digital contents different from the first page on a second area of the display; and
    when a two-dimensional (2D) image is changed to a three-dimensional (3D) image, adjusting a three-dimensional (3D) depth value of one of the first page and the second page such that the first page has a perceived 3D depth different from a perceived 3D depth of the second page while the first page and the second page are both displayed on the display.

16. The method of claim 15, wherein the digital contents include one of an electronic document, a menu, and a home screen.

17. The method of claim 15, wherein adjusting the 3D depth value comprises:
    in response to sensing a proximity touch input applied to the first page, adjusting the 3D depth value of the first page based at least in part on a degree of the touch input.

18. The method of claim 15, further comprising:
    in response to detecting a control command for turning over a page of the digital contents, changing a page displayed in the first area to the second page, and adjusting the 3D depth value of the second page such that the second page has a 3D depth value different from the 3D depth value of the first page.

19. The method of claim 18, wherein the 3D depth value of the page displayed in the first area of the display is controlled based at least in part on a number of pages displayed in the first area of the display.

20. The method of claim 15, further comprising:
    when a drag input is received after one of the first page and the second page is selected, detecting a control command for turning over a page of the digital contents; and when one of the first page and the second page is selected, adjusting the 3D depth value of one of the first page and the second page.

21. The method of claim 20, wherein adjusting the perceived 3D depth value of one of the first page and the second page comprises:
when one of the first page and the second page is selected, adjusting the 3D depth value of the other one of the first page and the second page such that the first page and the second page have the same perceived 3D depth.

22. The method of claim 15, wherein the first page and the second page each separately include a base and a plurality of objects displayed on the base, wherein the method further comprises:
adjusting the 3D depth of each of the objects such that the objects have a 3D depth value different from the 3D depth value of the base.

23. The method of claim 22, wherein adjusting the 3D depth value of each of the objects comprises:
generating priority information to determine priority levels of the objects based on attribute information of each of the objects, and adjusting a 3D depth value of each of the objects based at least in part on the priority information.

24. The method of claim 15, further comprising:
in response to sensing a touch input applied to a first page in order to select a region, displaying, on the display, the selected region having a 3D depth value different from the 3D depth value of the first page.

25. The method of claim 24, further comprising: generating at least one object corresponding to a control command with respect to the selected region, and displaying, on the display, the generated object having a 3D depth value different from the selected region.

* * * * *